April 9, 1957  J. G. KNOWLES  2,788,094
HYDRAULIC BRAKE SYSTEM FOR MOTOR VEHICLES
Filed Aug. 5, 1952  2 Sheets-Sheet 1
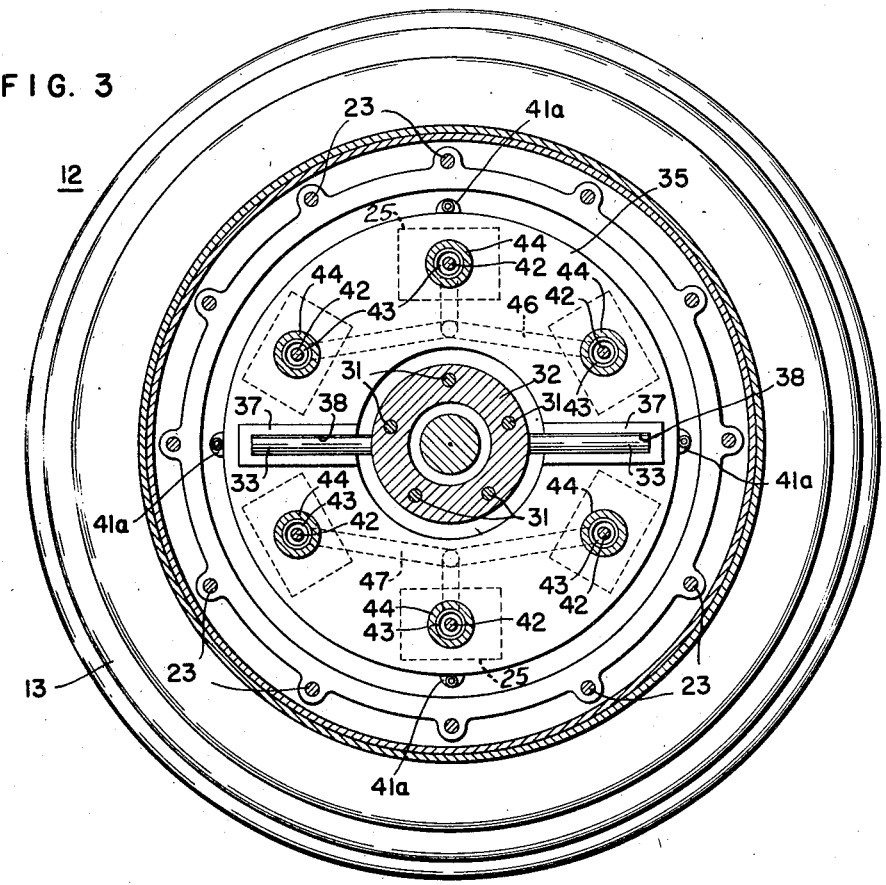
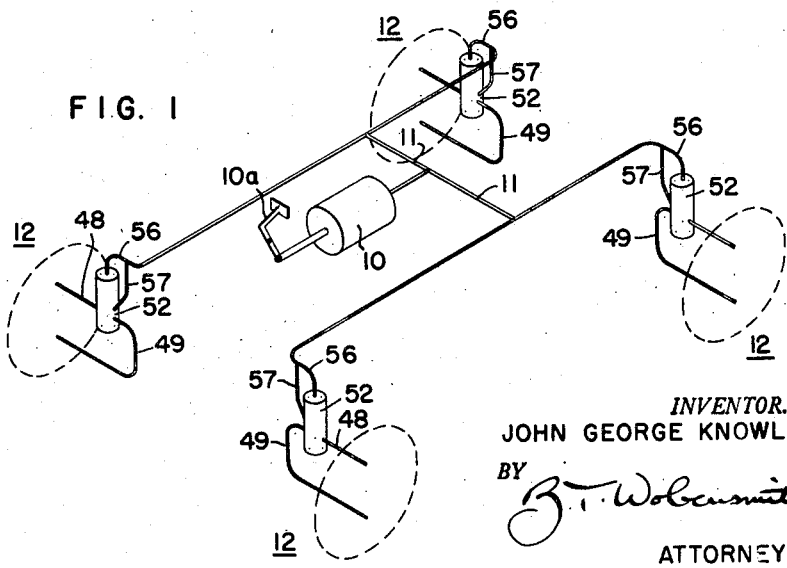
INVENTOR.
JOHN GEORGE KNOWLES
BY
ATTORNEY.

April 9, 1957

J. G. KNOWLES 2,788,094

HYDRAULIC BRAKE SYSTEM FOR MOTOR VEHICLES

Filed Aug. 5, 1952

INVENTOR.
JOHN GEORGE KNOWLES
BY

ATTORNEY.

United States Patent Office 2,788,094
Patented Apr. 9, 1957

2,788,094

HYDRAULIC BRAKE SYSTEM FOR MOTOR VEHICLES

John G. Knowles, Huntingdon Valley, Pa.

Application August 5, 1952, Serial No. 302,698

8 Claims. (Cl. 188—152)

This invention relates to hydraulic brake systems for motor vehicles and more particularly to improvements in the brake systems for the respective wheels and the control thereof.

In hydraulic brake systems now available a master cylinder is provided, having a piston therein operated by the brake pedal, each of the wheels having a cylinder connected to the master brake cylinder with a linkage from the wheel cylinders for actuating the brake bands.

In accordance with the present invention, improved structure is provided for applying the braking force at the wheels.

In accordance with the present invention, also, an improved character of control is provided for the application of the braking force at the wheels.

Other objects and advantageous features of the invention will be apparent from the specification and claims.

The nature and characteristic features of the invention will be more readily understood from the following description taken in connection with the accompanying drawings forming part hereof, in which:

Figure 1 is a diagrammatic view of a hydraulic brake system for vehicles in accordance with the invention;

Fig. 3 is a sectional view taken approximately on the line 3—3 of Fig. 2.

Figure 2:
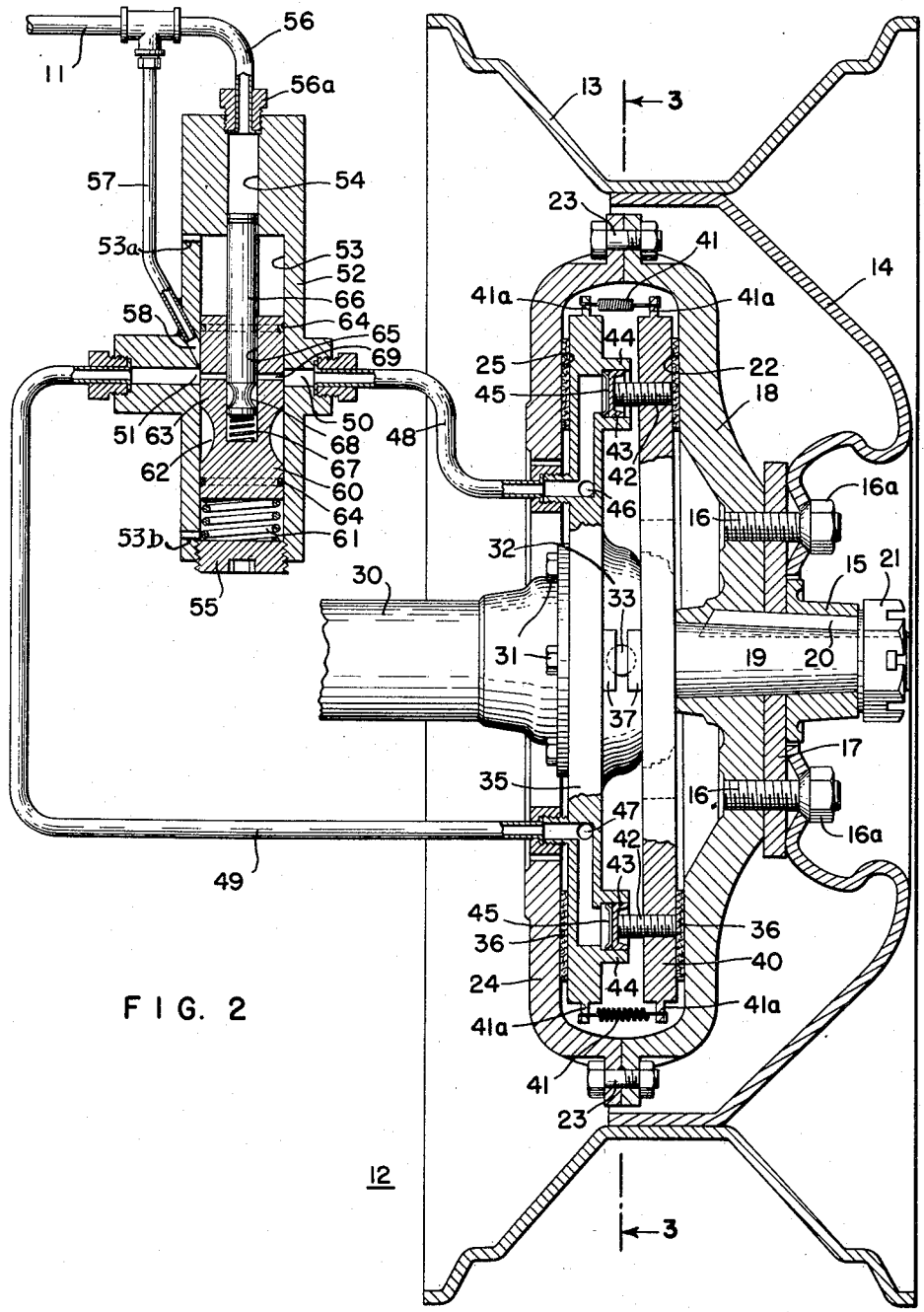
Fig. 2 is a vertical sectional view taken through the rotational axis of one of the vehicle wheels showing the details of construction of the brake control structure for each wheel.

Referring now more particularly to Fig. 1 of the drawings, a master brake cylinder is shown at 10, with an actuating pedal 10a, from which fluid pressure lines 11 extend to each of the wheels 12 for the delivery and return of brake fluid, as hereinafter more fully explained.

A wheel 12 is shown in Figs. 2 and 3 with the brake system in accordance with the present invention applied thereto. The wheel 12 has the customary tire receiving rim 13, supporting disk 14, and hub 15, the disk 14 being secured by nuts 16a on bolts 16 which extend through a spacer plate 17 and into a brake drum 18. The brake drum 18 and hub 15 are keyed to the tapered end of an axle 19 by a key 20. A nut 21, on the end of the axle 19, holds the hub 15 and drum 18 in position on the axle 19.

The brake drum 18 has a braking face 22 and has secured thereto, by bolts 23, a second brake drum 24 which has a braking face 25 in facing relation to the braking face 22.

The braking faces 22 and 25 are not disposed in parallel planes but in planes slightly inclined with respect to each other for a camming effect, as hereinafter more fully set forth. The variation in spacing may be of the order of 1/8" longitudinally of the axle 19 in 7 inches diameter transverse to the axle 19.

The axle 19 extends into and is supported by suitable bearings (not shown) in the fixed axle housing 30.

The axle housing 30, at the outer end thereof has secured thereto, by bolts 31, a back plate 32 from which bearing arms 33 extend in diametrical alinement.

A back brake disc 35 is provided having secured on the back face thereof a flat ring 36 of brake lining material of any preferred type. The disc 35 has in diametrical alinement bearing blocks 37 with semi-cylindrical alined recesses 38, closed at their outer ends. The bearing blocks 37, at the recesses 38, engage the arms 33.

A front brake disc 40 is also provided, having secured on the front face thereof a flat ring 36 of brake lining material of any preferred type. The disc 40 also has bearing blocks 37 thereon in diametrical alinement with alined recesses 38 for engagement with the arms 33.

The peripheries of the discs 35 and 40 are connected at a plurality of locations by connecting springs 41 which engage in lugs 41a.

The disc 40 is provided, at a plurality of locations, and preferably each at corresponding radial and circumferential spacing, with studs 42 which project beyond the back face of the disc 40 and have pistons 43 mounted thereon for reception in cylinders 44 mounted on the front face of the back disc 35. Within each cylinder 44, a resilient disc 45, of rubber or the like is provided for sealing the fluid and preventing leakage thereof.

One contiguous group of cylinders 44 is preferably interconnected by passageways 46 in the disc 35 and another contiguous group of cylinders 45 is interconnected by passageways 47 in the disc 35.

The passageways 46 have a hose line 48 in communication therewith and the passageways 47 have a hose line 49 in communication therewith. The ends of the hose lines 48 and 49 are connected to opposed ports 50 and 51 in a valve housing 52.

The valve housing 52 has an interior longitudinal cylindrical bore 53, with which the ports 50 and 51 are in communication, and the bore 53 has, axially alined therewith, a smaller cylindrical bore 54. The valve housing 52 is closed at one end by a closure plug 55, in fluid tight engagement therein and at the other end the bore 54 is connected by a pipe 56 terminating in a coupling 56a to one of the pressure lines 11. The upper and lower ends of the bore 53 may be vented to the atmosphere by passageways 53a and 53b.

A bypass line 57 is connected to the pressure line 11 and to the valve housing 52 with a port 58 extending upwardly beyond the port 51.

Within the bore 53, a main control valve 60 is provided, a compression spring 61 being provided between the end closure plug 55 and the lower end face of the valve 60. The valve 60 is provided with a circumferential groove 62 and a cylindrical portion 63 for establishing communication between the ports 50 and 51 and also with the port 58, or for cutting off communication among these ports as hereinafter explained.

The valve 60, at its upper and lower ends, is provided with packings 64 for preventing fluid flow thereby and has an axially extending cylindrical bore 65 for the reception and movement therein of an actuator rod or auxiliary valve 66, which extends into and is movable in the bore 54, the pressure of the fluid in the bore 54 being effective thereagainst.

Within the bore 65 a compression spring 67 is provided which normally urges the rod 66 upwardly. The spring 67 is preferably a stronger spring than the spring 61 so that the spring 61 upon the application of force thereon is compressed first and to the desired extent before the spring 67 is compressed. Spaced from the lower end of the rod 66 a circumferential groove 68 is provided, this with the cylindrical portion of the rod thereabove tending to establish or cut off communication through a restricted passageway 69 across the interior of the main valve 60, intersecting the bore 65, and adapted, when the valve 60 is at a certain position, to connect the ports 50 and 51.

The mode of operation will now be pointed out.

When the brake pedal 10a is fully released, no pressure is applied through the pressure lines 11.

The valve 60, urged by the spring 61 will be in its uppermost position, with the groove 62 positioned for free communication between the ports 50 and 51 and also with the port 58. The valve rod 66, urged by the spring 67 will also be in its uppermost position.

The brake discs 35 and 40 are held in engagement with the arms 33 and are held by the springs 41.

As the brake drums 18 and 24 rotate with respect to the brake discs 35 and 40 there is a progressive or rotary advancing tendency, because of the non-parallel spacing of the braking faces 22 and 25, to squeeze the discs 35 and 40 at the portion of the drums 18 and 24 which are closest together. The free circulation of liquid, because of the positioning of the valve rod 60, permits of shifting of the discs 35 and 40 about the pivotal axis provided by the arms 33, free transfer of liquid from one group of cylinders 44 to the other and obviates any application of braking force.

Upon the initial application of the brake pedal 10a, the actuation of the master brake piston (not shown) in the master brake cylinder 10 results in increased pressure in the pressure lines 11 and in each of the pipes 56, the bypass lines 57 and through the lines 48 and 49 and in the cylinders 44. The brake discs 35 and 40 thus have imparted thereto a tendency to separate so that the brake linings are moved into a slight engagement with the braking faces 22 and 25.

Upon continued increase in pressure from the master brake cylinder 10 in the lines 11, the valve 60 is brought into play. The increased pressure effective on the upper end of the rod 66 tends to move and moves the rod 66 downwardly, the spring 67 not being appreciably compressed. This downward movement of the rod 66, moves the valve 60 downwardly, against the force of the spring 61, and the groove 62 is moved to cut off communication of the port 58 with the ports 50 and 51 but permitting restricted flow between the ports 50 and 51.

It will be recognized that with the wheels rotating there is a continuous pumping action, as the brake discs 35 and 40 are continuously rocked on the bearing arms 33 by the braking faces 22 and 25. The restriction on the free movement of the fluid, dependent upon the positioning of the valve 60, results in a braking force being applied by the brake linings 36 against the braking faces 22 and 25.

Upon further or increased application of pressure in the lines 11, the valve 60 is moved downwardly, and still without substantial compression of the spring 67, so that the groove 62 is below the ports 50 and 51 and the restricted passageway 69 is effective to permit a still more limited flow of fluid between the ports 50 and 51 around the groove 68.

Upon further increase of the pressure of the brake fluid from the brake cylinder 10, the valve rod 66 is moved downwardly to shut off communication through the passageway 69, by compression of the spring 67, so that the fluid is blocked within the lines 48 and 49 with an effectual locking of the brake discs 35 and 40 because of the resistance to movement of the pistons 43 in the cylinders 44 of the blocked fluid.

Upon the release of the pressure applied by the brake pedal 10a in the master brake cylinder 10, the valve 60 and the rod 66 return in a step by step relation in reverse to that described above for the applying of the brakes.

It will be noted, however, that upon brake release when the restricted passageway 69 is opened for communication, by reason of the positioning of the rod 66 with its groove 68 alined with the passageway 69, the release of the pressure between the ports 50 and 51 permits of a freer return movement of the valve 60 to its original position. The mechanism, of course, is in position at any time for partial or complete application or release of braking pressure, if, and as desired.

I claim:

1. In a hydraulic brake control system for a brake drum having spaced facing portions in non-parallel relation, the combination comprising a pair of discs fixed against rotation disposed between said facing portions and each having an outer face portion for braking engagement with one of said facing portions, a diametrically disposed transverse pivotal abutment interposed between said discs, said discs having a plurality of expansible chamber members interposed therebetween on different radii for urging said discs apart, resilient connections between said discs for urging said discs toward each other, a source of controlled pressure fluid, fluid connections from said source to said expansible chamber members, and valve means having portions for controlling the application of pressure fluid from said source to said fluid connections.

2. In a hydraulic brake control system for a brake drum having spaced facing portions in non-parallel relation, the combination comprising a pair of discs fixed against rotation disposed between said facing portions and each having an outer face portion for braking engagement with one of said facing portions, a diametrically disposed transverse pivotal abutment interposed between said discs, one of said discs having a plurality of cylinders on different radii on opposite sides of said abutment, fluid connections for respectively interconnecting the cylinders on each of the sides of said abutment, the other of said discs having pistons secured thereto and movable in said cylinders for urging said discs apart, resilient connections between said discs for urging said discs toward each other, a source of controlled pressure fluid, additional fluid connections respectively communicating with said first mentioned fluid connections, and valve means to which said additional fluid connections are connected for controlling the application of pressure fluid from said source to said additional fluid connections.

3. A hydraulic brake control system as defined in claim 2 in which said valve means has portions for controlling the fluid flow between the cylinders on opposite sides of said abutment.

4. In a hydraulic brake control system for a brake drum having spaced facing portions in non-parallel relation, the combination comprising a pair of discs fixed against rotation interposed between said facing portions each having outer face portions for braking engagement with said facing portions, a transverse pivotal abutment interposed between said discs, one of said discs having a plurality of cylinders on different radii on opposite sides of said abutment with fluid connections between groups of said cylinders and the other of said discs having pistons secured thereto and movable in said cylinders for urging said discs apart, resilient connections between said discs for urging said discs toward each other, a source of controlled pressure fluid, a valve housing to which said source is connected, additional fluid connections from the fluid connections to said cylinders to said valve housing, and valve means in said valve housing having portions for controlling the communication between said additional fluid connections and portions for controlling the communication between said source and said additional fluid connections.

5. A hydraulic brake control system as defined in claim 4 in which said valve means is fluid pressure actuated and is controlled by the pressure of the fluid from said source.

6. In a brake control system for a brake drum having axially spaced braking face portions and brake members fixed against rotation interposed between said face portions and axially separable for engagement with said face portions, the combination comprising a controlled source of fluid under pressure, a valve housing, a first movable valve member in said housing, a second movable valve member for controlling the positioning of said first valve member, a resilient member interposed between said first valve member and said housing, a fluid connection from said source to said housing in communication with said second valve member for applying pressure fluid thereagainst, said brake members having a plurality of fluid pressure actuated members on different radii for urging said members axially apart, fluid connections from groups of said pressure actuated members to ports in said housing, a fluid connection from said source to said housing, said first valve member having a portion for connecting and cutting off communication between said source and said ports in one position and for connecting said ports in another position of said first valve member with said source cut off, said first valve member having a restricted passageway for connecting said ports in another position of said first valve member with said source cut off, said first valve member having a restricted passageway for connecting said ports in another position of said first valve member with said source cut off.

7. A brake control system as defined in claim 6 in which said second valve member has a portion for controlling the flow through said restricted passageway.

8. In a brake control system for a brake drum having axially spaced braking face portions and brake members fixed against rotation interposed between said face portions and axially separable for engagement with said face portions, the combination comprising a controlled source of fluid under pressure, a valve housing, said housing having a bore with an enlarged portion and another portion, a first movable valve member in said enlarged portion of said bore, a second movable valve member for controlling the positioning of said first valve member and extending thereinto and into the other portion of said bore, a resilient member interposed between said first valve member and said housing, a resilient member interposed between said second valve member and said first valve member, a fluid connection from said source to said housing in communication with said second valve member for applying pressure fluid thereagainst, said brake members having a plurality of fluid pressure actuated members on different radii for urging said members axially apart, fluid connections from groups of said pressure actuated members to ports in said housing, a fluid connection from said source to an outlet in said housing axially to one side of said ports, said first valve member having a portion for connecting said outlet and said ports in one position and for cutting off said outlet and connecting said ports in another position of said first valve member, said first valve member having a restricted passageway for connecting said ports in another position of said first valve member, said first valve member having a restricted passageway for connecting said ports in another position of said first valve member, and said second valve member having a portion for controlling the flow through said restricted passageway.

References Cited in the file of this patent

UNITED STATES PATENTS

| 2,376,685 | Goepfrich | May 22, 1945 |
| 2,414,753 | Majneri | Jan. 21, 1947 |
| 2,546,367 | Majneri | Mar. 27, 1951 |
| 2,595,859 | Lambert et al. | May 6, 1952 |
| 2,617,620 | Baldwin | Nov. 11, 1952 |

FOREIGN PATENTS

| 474,539 | Great Britain | Nov. 3, 1947 |